United States Patent
Johnston et al.

(10) Patent No.: US 10,374,497 B2
(45) Date of Patent: Aug. 6, 2019

(54) METHOD TO MANUFACTURE IMPROVED EXCITER FOR AN ELECTRICAL GENERATOR

(71) Applicants: Gwynne Johnston, Barrington Hills, IL (US); Erik J. Hilinski, Hawthorn Woods, IL (US)

(72) Inventors: Gwynne Johnston, Barrington Hills, IL (US); Erik J. Hilinski, Hawthorn Woods, IL (US)

(73) Assignee: TEMPEL STEEL COMPANY, Chicago, IL (US)

( * ) Notice: Subject to any disclaimer, the term of this patent is extended or adjusted under 35 U.S.C. 154(b) by 651 days.

(21) Appl. No.: 15/006,262

(22) Filed: Jan. 26, 2016

(65) Prior Publication Data

US 2017/0214299 A1 Jul. 27, 2017

(51) Int. Cl.
*C21D 8/12* (2006.01)
*H01F 1/16* (2006.01)
(Continued)

(52) U.S. Cl.
CPC .............. *H02K 15/02* (2013.01); *C21D 8/12* (2013.01); *C21D 8/1233* (2013.01); *C21D 8/1272* (2013.01); *C22C 38/004* (2013.01); *C22C 38/008* (2013.01); *C22C 38/02* (2013.01); *C22C 38/04* (2013.01); *C22C 38/06* (2013.01);
(Continued)

(58) Field of Classification Search
CPC ...... H02K 15/02; C21D 8/1233; C22C 38/02; C22C 38/04; C22C 38/06; C22C 38/002
See application file for complete search history.

(56) References Cited

U.S. PATENT DOCUMENTS 2,810,085 A 10/1957 Akeley
3,034,035 A 5/1962 Baumann
(Continued)

FOREIGN PATENT DOCUMENTS

EP 2385147 A2 11/2011
EP 2385147 A3 3/2014

OTHER PUBLICATIONS

European Application No. EP 16 20 1711 Search Report dated May 2, 2017.
(Continued)

*Primary Examiner* — Livius R. Cazan
(74) *Attorney, Agent, or Firm* — Schiff Hardin LLP (57) ABSTRACT

In a method to manufacture an improved exciter for a generator, the exciter comprising an exciter rotor, and an exciter stator, a coil of full hard cold rolled electrical steel is provided, the steel comprising at least silicon in a weight percent greater than 0.60%. Without a prior annealing of the full hard cold rolled steel coil, the coil is slit to create at least one strip. The at least one strip is stamped to create a plurality of rotor laminations and a plurality of stator laminations from the same strip. The rotor laminations are separated from the stator laminations and the set of rotor laminations and the set of stator laminations are created. Only the set of exciter rotor laminations are annealed. The annealed set of exciter rotor laminations are assembled to create the exciter rotor and the set of not annealed exciter stator laminations are assembled to create the exciter stator.

11 Claims, 5 Drawing Sheets

(51) Int. Cl.
  *H02K 1/02*    (2006.01)
  *C22C 38/00*   (2006.01)
  *C22C 38/02*   (2006.01)
  *C22C 38/04*   (2006.01)
  *C22C 38/06*   (2006.01)
  *H02K 15/02*   (2006.01)

(52) U.S. Cl.
  CPC ........... *H02K 1/02* (2013.01); *C21D 2261/00* (2013.01); *H01F 1/16* (2013.01)

(56) References Cited

U.S. PATENT DOCUMENTS

2011/0273054 A1    11/2011    Johnston
2013/0022833 A1*   1/2013     Wakade ................ C22C 38/004
                                                         428/611
2013/0039804 A1    2/2013     Johnston
2013/0183192 A1    7/2013     Hill et al.
2015/0318093 A1    11/2015    Hill et al.

OTHER PUBLICATIONS

European Application No. 16 201 711.5—Office Action dated Dec. 18, 2018.

\* cited by examiner

| Magnetic Property | Not Annealed | After anneal |
|---|---|---|
| | Prior Art CRML-FH | Prior Art CRML-FH |
| Core Loss, watts/kg @ 1.5 Tesla, 50 Hz | 12.5 | 7.2 |
| Peak Permeability, @1.5 Tesla, 50 Hz | 560 | 2200 |
| Coercivity, Hc, A/m, @ 1.0 Tesla, 50 Hz | 545 | < 80 |
| Retentivity, Br, Tesla, @ 1.0 Tesla, 50 Hz | 0.67 | ** |

FIG. 5 (PRIOR ART)

| Magnetic Property | Not Annealed | | After anneal | |
|---|---|---|---|---|
| | Prior Art CRML-FH | High remnance hard steel | Prior Art CRML-FH | High remnance hard steel |
| Core Loss, watts/kg @ 1.5 Tesla, 50 Hz | 12.5 | 27.3 | 7.2 | 19.6 |
| Peak Permeability, @1.5 Tesla, 50 Hz | 560 | 388 | 2200 | 758 |
| Coercivity, Hc, A/m, @ 1.0 Tesla, 50 Hz | 545 | 600 | < 80 | 300 |
| Retentivity, Br, Tesla, @ 1.0 Tesla, 50 Hz | 0.67 | 0.8 | ** | ** |

FIG. 6

27 — PROVIDING COIL OF FULL HARD COLD ROLLED ELECTRICAL STEEL COMPRISING AT LEAST THE FOLLOWING ELEMENTS IN WEIGHT PERCENT ALONG WITH IRON AND IMPURITIES

| | |
|---|---|
| CARBON | LESS THAN 0.04% |
| MANGANESE | 0.10% TO 1.5% |
| PHOSPHORUS | 0.005% TO 0.12% |
| SILICON | GREATER THAN 0.60% |
| ALUMINUM | 0.05% TO 1.0% |

↓

28 — WITHOUT PRIOR ANNEALING OF THE FULL HARD COLD ROLLED STEEL COIL, SLITTING THE COIL TO CREATE AT LEAST ONE STRIP

↓

29 — STAMPING THE AT LEAST ONE STRIP TO CREATE A PLURALITY OF EXCITER ROTOR LAMINATIONS AND A PLURALITY OF EXCITER STATOR LAMINATIONS FROM THE SAME STRIP

↓

30 — SEPARATING THE EXCITER ROTOR LAMINATIONS FROM THE EXCITER STATOR LAMINATIONS AND CREATING THE SET OF EXCITER ROTOR LAMINATIONS AND THE SET OF EXCITER STATOR LAMINATIONS

↓

31 — ANNEALING ONLY THE SET OF EXCITER ROTOR LAMINATIONS

↓

32 — ASSEMBLING THE ANNEALED SET OF EXCITER ROTOR LAMINATIONS TO CREATE SAID EXCITER ROTOR AND ALSO ASSEMBLING THE SET OF EXCITER STATOR LAMINATIONS TO CREATE THE EXCITER STATOR

| Magnetic Property | Not Annealed | | | After anneal | | |
|---|---|---|---|---|---|---|
| | Prior Art CRML-FH | High remnance hard steel | Improved CRES | Prior Art CRML-FH | High remnance hard steel | Improved CRES |
| Core Loss, watts/kg @ 1.5 Tesla, 50 Hz | 12.5 | 27.3 | 22.8 | 7.2 | 19.6 | 5.45 |
| Peak Permeability, @1.5 Tesla, 50 Hz | 560 | 388 | 221 | 2200 | 758 | 2032 |
| Coercivity, Hc, A/m, @ 1.0 Tesla, 50 Hz | 545 | 600 | 610 | <80 | 300 | <50 |
| Retentivity, Br, Tesla, @ 1.0 Tesla, 50 Hz | 0.67 | 0.80 | 0.63 | ** | ** | ** |

FIG. 7

| Magnetic Property | Not Annealed | | After anneal | |
|---|---|---|---|---|
| | Improved CRES, 0.50 mm | Improved CRES, 0.65 mm | Improved CRES, 0.50 mm | Improved CRES, 0.65 mm |
| Core Loss, watts/kg @ 1.5 Tesla, 50 Hz | 22.8 | 24.8 | 5.45 | 7.2 |
| Peak Permeability, @1.5 Tesla, 50 Hz | 221 | 250 | 2032 | 2500 |
| Coercivity, Hc, A/m, @ 1.0 Tesla, 50 Hz | 610 | 610 | <50 | <50 |
| Retentivity, Br, Tesla, @ 1.0 Tesla, 50 Hz | 0.63 | 0.63 | ** | ** |

FIG. 8

METHOD TO MANUFACTURE IMPROVED EXCITER FOR AN ELECTRICAL GENERATOR

BACKGROUND

As is well known, an electrical motor is a device whereby electrical power, through passage of current in windings in a "Stator", is converted into mechanical power by means of rotation of a "Rotor", through which a fixed mechanical shaft has been inserted. An electrical generator is the reverse of an electrical motor. Mechanical power, through external rotation or drive of a fixed mechanical shaft, inserted in a rotor, is converted into electrical power by creation of current in windings in the stator which may be used to power electrical devices. In the vast majority of cases, the materials used for construction of the stator and rotor are stamped laminations which are stacked into cores to form both the stator and the rotor.

A fundamental principle of Physics for operation of either a motor or a generator is the "Right Hand Rule" whereby a current, rotating in a winding in one direction (x direction), produces an electrical field at 90° to the current (y direction), which, in turn, produces a force in the orthogonal 90° direction (z direction). Thus, the standard design of a motor and a generator is based on a fixed or stationary stator, with electrical windings, which couples with a rotor by means of an electrical field between the stator and the rotor. In the case of a motor, the passage of an electrical current in the stator generates a field which couples with the rotor to produce a force which causes rotation of the rotor and, hence, mechanical power. In the case of a generator, the externally driven rotation of the rotor, together with either an electrical field and/or a current in the rotor, couples with the stator to produce an electrical current in the windings of the stator. The external drive or rotation of the rotor, in and of itself, is not sufficient to start and operate the generator. There also has to be an electrical field and/or a current in the windings of the rotor. The current in the windings of the rotor has to be started in some way. This process is known as "rotor excitation".

In the market designs for small, portable or stand-by generators, there are several techniques used to achieve an electrical field and/or current in the rotor which can be used to "excite" the rotor (and subsequently generate current in the stator) in the generator:

Permanent magnets may be added to the rotor together with an excitation winding. Rotation of the permanent magnets produces a current in the excitation winding which, in turn, induces a current in the main rotor winding, and, subsequently, an electrical field which produces current in the stator winding.

Flash circuits, together with an excitation winding, may be added to the rotor. Rotation of the rotor initiates a current in the Flash circuit and winding (by means of an applied voltage) which, in turn, induces a current in the main rotor winding, and, subsequently, an electrical field which produces current in the stator winding.

Hard electrical steel, which has the property of retaining a small magnetic field, may be used as part of the design of the rotor whereby, after flashing, the hard electrical steel retains properties of permanent magnetism. Rotation of this permanent magnetic field produces a current in the winding which produces an electrical field to excite or produce current in the stator. There are 2 categories of hard steel used for generator application, being (1) steel that is hardened through alloy content and (2) Full Hard steel achieved through processing. The inherent problem with this design using hard steel is that, while costs are low, compared to the use of magnets or flash circuits, the magnitude of the permanent magnetic field is low. Further, this magnetic field may be reduced in time with high operating temperatures, resulting in a failure of the generator to start.

The term "full hard" as used in this specification is defined as a condition of cold rolled electrical steel of a coil of the cold rolled electrical steel following sufficient cold rolling, and prior to a subsequent anneal, beyond which there is no further change in hardness or tensile strength of the steel.

A further sophistication of the design of the rotor is that, in some cases, the rotor may be designed in 2 parts, with a main rotor and main rotor winding accompanied by a separate exciter and exciter winding. The alternative simple design is comprised of one rotor construction with both main windings and separate exciter windings.

Figure 1:
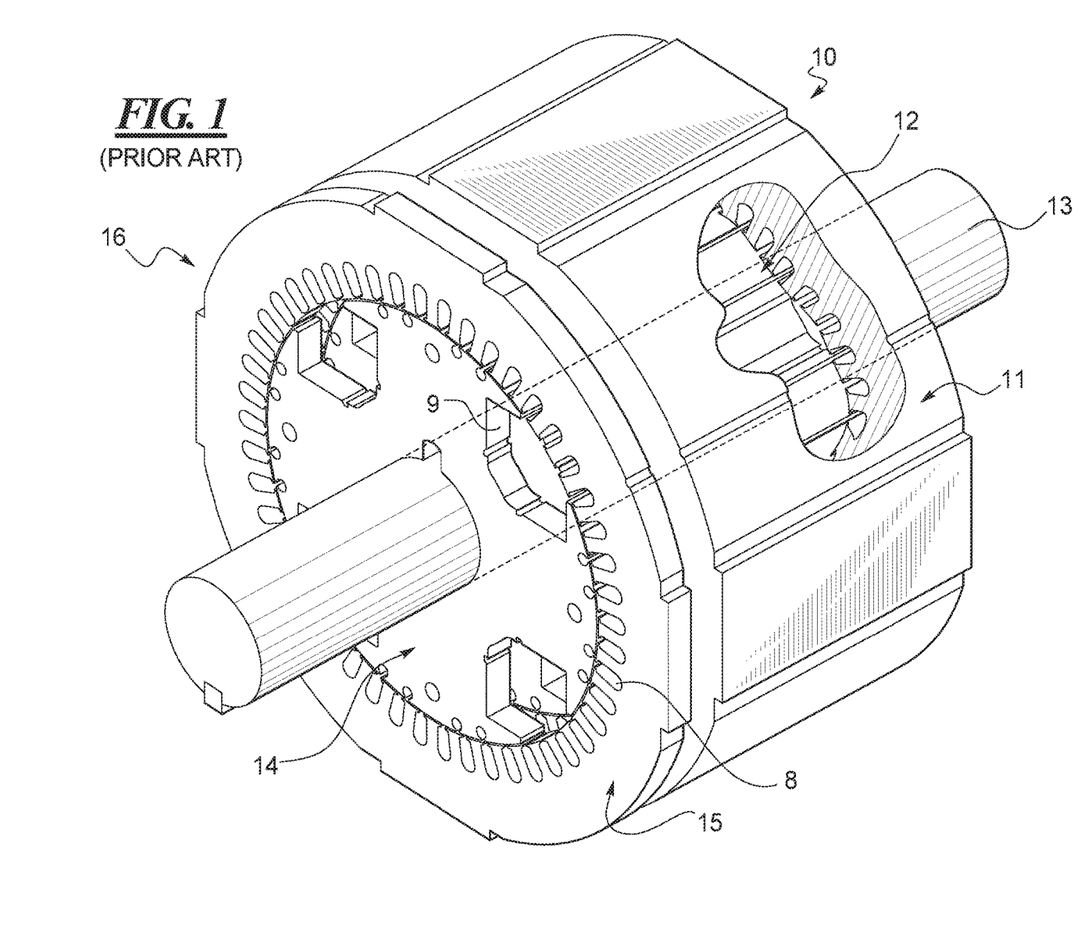
FIG. 1 is a perspective view of a prior art generator having a main rotor and stator and an exciter rotor and stator.

FIG. 1 shows, in a perspective view, a prior art generator 10 having a main stator 11 surrounding an internal main rotor 12 shown in a fragmentary cut away view within the stator 11. The rotor 12 is mounted on a shaft 13. Also mounted to the shaft 13 is an exciter rotor 14 surrounded by an exciter stator 15 which together with the rotor 14 form an exciter 16. As is well known, slots are provided in both the main rotor and stator and also in the exciter rotor and stator to receive respective windings. As shown in FIG. 1, slots 8 are provided for receiving an exciter stator winding (not shown) and slots 9 are provided for receiving a respective exciter rotor winding (not shown). Laminations for forming the main rotor and stator and the exciter rotor and stator may be stamped to have a same or similar configuration or a different configuration.

Figure 2:
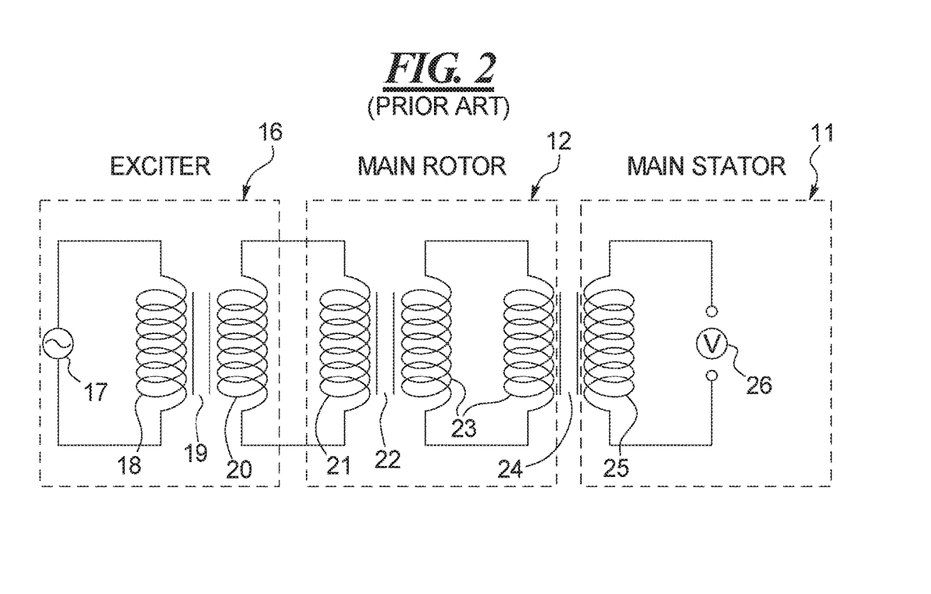
FIG. 2 is a schematic wiring diagram showing connection of windings of the main generator rotor and stator and exciter rotor and stator.

A simplified wiring diagram showing the windings for the main rotor and stator and the exciter rotor and stator applicable to generators where the exciter is separate to the main generator is shown in prior art FIG. 2. Here, exciter 16 is schematically illustrated by a dashed box surrounding an excitation source 17 for a flash circuit, or a residual magnetic field (magnets, or hard steel with steel property Hc). FIG. 2 illustrates the exciter stator winding 18, a transfer magnetic field 19 (air gap between stator and rotor), an exciter rotor winding 20, an exciter winding 21 in the main rotor, a transfer magnetic field 22 (rotor electrical steel), a main rotor winding 23, a transfer magnetic field 24 (air gap between rotor and stator), a main stator winding 25, and a power output 26 from the stator. The main rotor is shown in a dashed line box 12 and the main stator is shown in a dashed line box 11.

As indicated, the practice of using Full Hard steel in generator applications has been in use for many years, especially in the USA. However, there is a sophistication which is well known and understood to those skilled in this technology, especially for practices and materials developed in the USA. Industry practice relies on the use of basic Cold Rolled Motor Lamination (CRML) steel, which has chemistries typically described by industry grades such as Type 2, Type 3 or Type 4 (descriptions of properties, but not chemistries, may be found in ASTM A726). Chemistries for these grades encompass ranges of elements described by the following weight percents:

| | |
|---|---|
| Carbon | less than 0.04% |
| Manganese | 0.10% to 1.5% |

-continued

| | |
|---|---|
| Phosphorus | 0.005% to 0.12% |
| Silicon | 0.10% to 0.60% |
| Aluminum | 0.05% to 0.35% |
| Iron | Balance, minus conventional impurities found in normal steelmaking practices |

Normal processing of this type of electrical steel for conventional CRML applications in motors follows the sequence:

Melting
Degassing (optional) and alloy addition
Casting
Hot rolling
Pickling
Cold rolling
Annealing (usually box annealing)
Temper rolling
Slitting and stamping into laminations
Final anneal prior to assembly into motors This process sequence, coupled with the use of chemistries and grades defined above, produces cold rolled CRML electrical steel with low core loss and excellent permeability, all with competitive cost structures.

The sophistication, well known to those who are expert in this technology, is that the processing of this steel, using the same chemistry or grades, may be changed wherein the step of annealing at the steel mill, following cold rolling, is eliminated. The elimination of this process step results in a full hard grade of CRML steel prior to stamping into laminations. After annealing by the lamination stamper, the core loss values are higher than the core loss for laminations processed conventionally but the permeability is similar for both processing conditions. However, if the laminations are stamped but not annealed, the laminations have high core loss, low permeability but do possess a small amount of residual magnetism which can be measured and defined according to the properties of coercivity (Hc) and retentivity (Br). This is shown in prior art FIG. 3.

Figure 3:
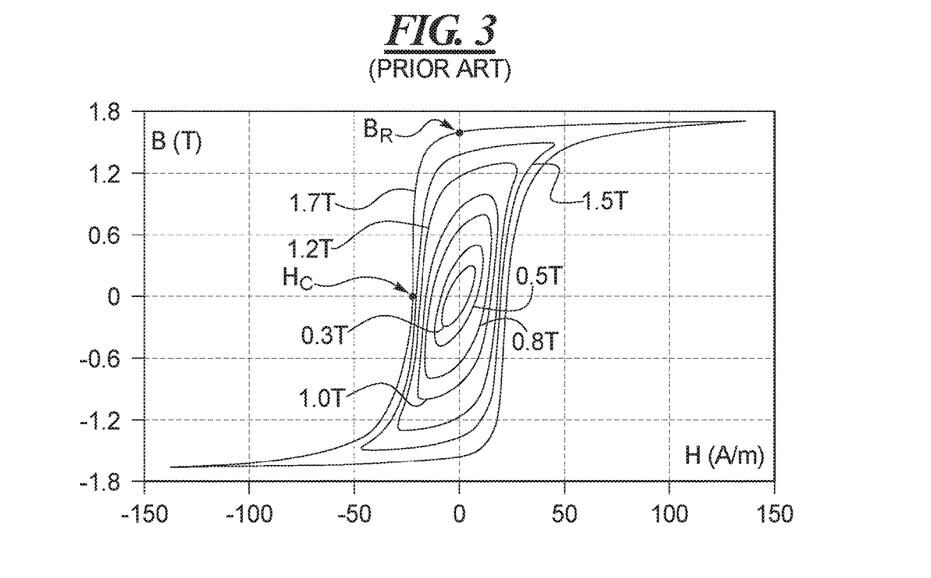
FIG. 3 is a diagram illustrating an example of Hysteresis curves according to the prior art.

In FIG. 3 an example is shown of Hysteresis curves, or the relationship between H (the applied electric field in the winding) and B (the induced magnetic field in the steel) at different inductions (in Tesla). Br is the residual reduced magnetic field (retentivity) where H=0 and Hc is the applied or coerced field (coercivity) required to overcome the retained magnetic field, where B=0.

Thus, it is known to those skilled in the art that the use of one grade of conventional CRML steel, as defined above, may be supplied by a steel mill in a full hard condition and, using one stamping die, may produce both:

Stator laminations, with good core loss and high permeability based on annealing after stamping, and
Rotor laminations, with residual magnetism sufficient for use in excitation of rotor windings in a generator application, based on the absence of annealing after stamping and the absence of annealing following cold rolling at the steel mill.

The major advantages of the above process and practice are low cost through the use of one stamping die and one material, without the additional costs of permanent magnets or flash circuits. The disadvantages, however, are that the value of residual magnetism is low, subject to possible decay, and the coupling of the rotor with the stator is not as efficient as the use of full electrical steel grades in both rotor and stator (because of the low permeability of full hard grades).

As indicated, there are other conventional alternatives to the use of Full Hard CRML electrical steel involving the use of specifically designed hard steel grades which are described as high residual or high remanence steel grades (refer to TKES and ArcelorMittal literature), especially for rotor designs where there is a separate exciter in addition to the main rotor. The disadvantages of this design approach are that the costs of these steel grades are significantly higher than full hard CRML and, often, there are significant scrap losses/costs since different materials (and stamping dies) may be required for both the stator and the rotor. The further implied disadvantage of hard or high remanence steels, using chemistry to achieve high hardness and, as a result, residual magnetism, is that low core loss and high permeability combinations cannot be achieved (such as in the use of Full Hard CRML steels, with annealing). However, the advantage of hard steels, using chemistry, is that significantly higher coercivity (Hc) may be obtained compared to conventional Full Hard CRML steel grades, as described above.

By convention, the measurement of coercivity (Hc), at a fixed frequency and fixed induction level, is used as a measure of the amount of residual magnetism in different steel grades. As a result, reference to coercivity (Hc) throughout the balance of this disclosure will be used to describe and measure the residual magnetism properties of different grades of steel. The units of A/m (amperes per meter) are used for the measurement of coercivity in this text (noting that conversion to other units, such as oersteds or A/cm, retain the same validity).

Figures 4, 5:
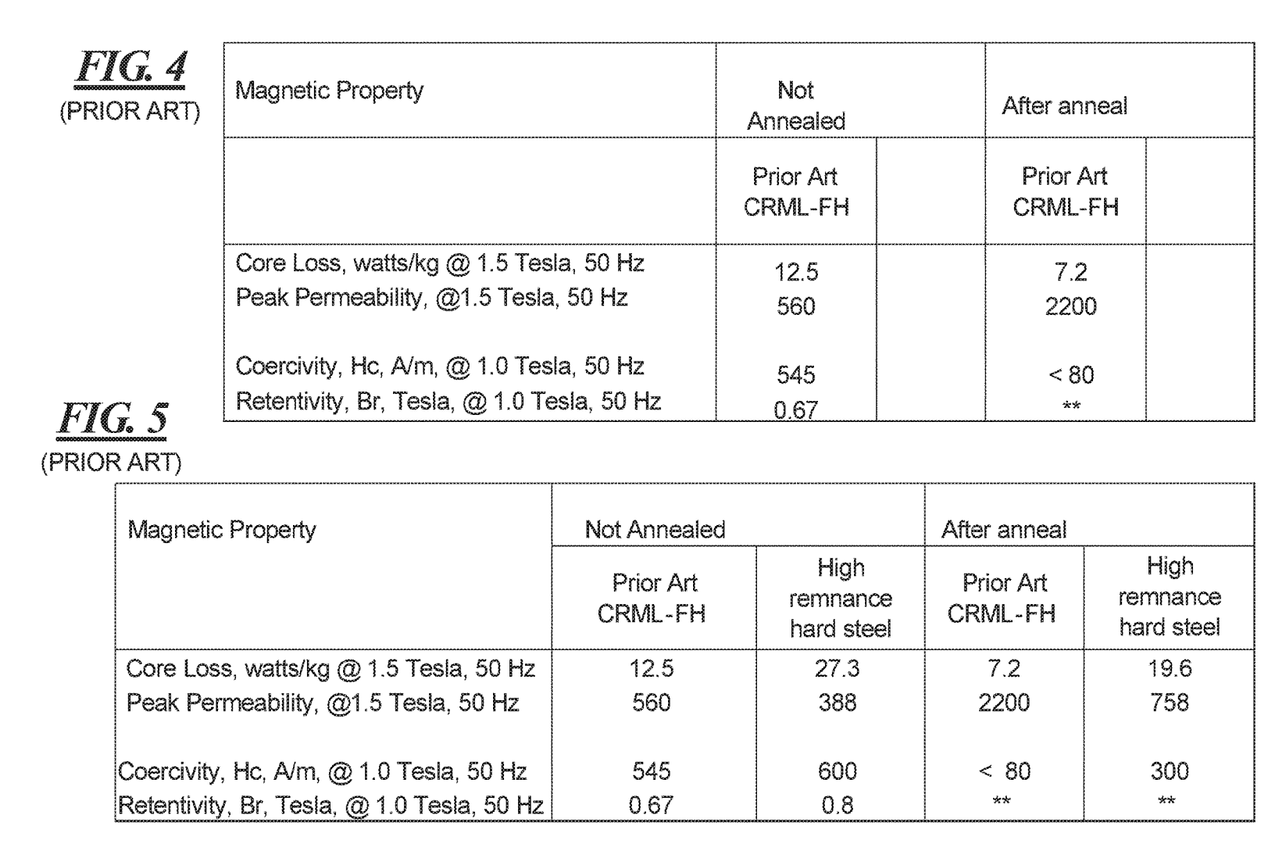
FIG. 4 is a table showing typical magnetic properties of conventional full hard CRML steel in the annealed and non-annealed conditions according to the prior art.
FIG. 5 is a table showing a comparison of electrical and magnetic properties for full hard CRML and a typical grade of high residual magnetism commercial steel according to the prior art.

Typical properties of a conventional 0.50 mm Full Hard CRML steel in the annealed and not annealed condition are shown in prior art FIG. 4.

FIG. 4 shows typical magnetic properties of 0.50 mm Full Hard CRML steel in the annealed (820° C.) and not annealed conditions according to the prior art.

FIG. 4 clearly shows the major difference or change in properties when comparing properties in the not-annealed and the annealed conditions. Electrical properties in the annealed condition indicate low core loss and excellent permeability, similar to or better than properties of a cold rolled electrical steel, grade 800. Electrical properties in the not-annealed condition are poor in terms of a high core loss and low permeability. However, coercivity Hc or permanent magnetism, is relatively high.

It is noted that, while core loss is dependent on thickness, coercivity is independent of thickness for different steel grades.

A comparison of electrical and magnetic properties for Full Hard CRML and a typical grade of high residual magnetism (high remanence) commercial steel, according to the prior art is shown in FIG. 5.

FIG. 5 shows a comparison of electrical and magnetic properties for Full Hard CRML (0.50 mm) and a typical grade of high residual magnetism (high remanence) commercial steel (1.00 mm) (both representing the prior art).

Two conclusions are immediately obvious from the data in FIG. 5:

1. Coercivity (Hc) of Full Hard conventional CRML steel is significantly lower (worse) than coercivity (Hc) for high remanence commercial steel
2. After anneal core loss and permeability of Full Hard conventional CRML steel is significantly better than after anneal core loss and permeability for high remanence commercial steel, to the extent that this type of steel should not be used where electrical efficiency is important.

The importance of FIG. 5 is that it clearly shows that a unique combination of electrical properties (low core loss and high permeability in the after anneal condition together with good coercivity in the not-annealed condition) is possible with conventional CRML in the full hard condition but not possible with conventional high remanence hard steel.

To date, it has not been known in the prior art to increase coercivity values for Full Hard CRML steel to values close to those for high residual magnetism other than to resort to the use of high residual magnetism commercial steel. The disadvantages of higher cost and poor magnetic properties remain for these grades (high remanence hard steel).

SUMMARY

In a method to manufacture an improved exciter for a generator, the exciter comprising an exciter rotor and an exciter stator, a coil of full hard cold rolled electrical steel is provided, the steel comprising at least silicon in a weight percent greater than 0.60%. Without a prior annealing of the full hard cold rolled steel coil, the coil is slit to create at least one strip. The at least one strip is stamped to create a plurality of rotor laminations and a plurality of stator laminations from the same strip. The rotor laminations are separated from the stator laminations and a set of rotor laminations and a set of stator laminations are created. Only the set of exciter rotor laminations are annealed. The annealed set of exciter rotor laminations are assembled to create the exciter rotor and the set of not annealed exciter stator laminations are assembled to create the exciter stator.

DESCRIPTION OF EXEMPLARY EMBODIMENTS

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

A method of one exemplary embodiment is presented whereby improved higher silicon cold rolled electrical steels (CRES), using both semi-processed and fully processed practices, may be employed to achieve higher residual magnetism, as measured by coercivity (Hc), than previous values of coercivity using conventional full hard semi-processed (CRML) grades. This property is important to achieve starting conditions or excitation in some designs of small and standby generators. The higher values of coercivity (Hc) for the improved higher silicon cold rolled electrical steels (CRES), used in the full hard condition, are similar to coercivity values in alternative technology wherein residual magnetism is achieved through the use of alloy additions and processing. However, the major advantage of improved higher silicon cold rolled electrical steels, used in the full hard condition, is that a unique combination of properties may be achieved, both high coercivity and excellent core loss and peak permeability, through the use of the improved CRES in the not-annealed condition for the stator component of the exciter of the generator, and in the annealed condition for the rotor component of the exciter. This unique combination of properties leads to improved efficiencies and reduction of costs, through savings in material, for small and standby generators.

Figure 6:
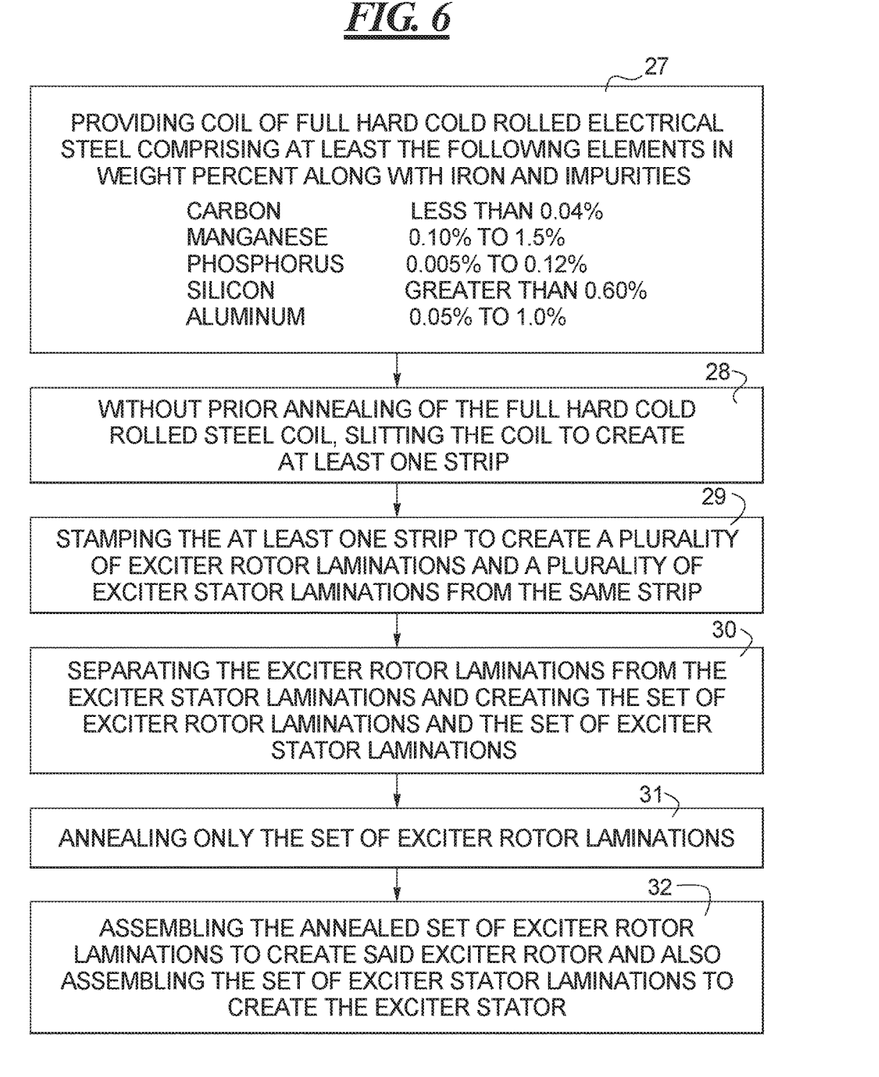
FIG. 6 is a flowchart of a method in an exemplary embodiment of the invention.

Method steps according to the at least one exemplary embodiment of the invention are shown in the flowchart of FIG. 6. In the method to manufacture an improved exciter for a generator, the exciter comprises an exciter rotor and an exciter stator. The exciter rotor and the exciter stator are each being formed of a respective set of laminations of a same electrical steel. To form these laminations, in a first step 27 a coil is provided of cold rolled electrical steel which after cold-rolling was not subsequently annealed. The electrical steel is full hard which is a condition of the electrical steel following sufficient cold rolling, and prior to a subsequent anneal, beyond which there is no further change in hardness or tensile strength of the steel. The steel comprises at least the following elements in weight percent along with iron and impurities.

| | |
|---|---|
| Carbon | less than 0.04% |
| Manganese | 0.10% to 1.5% |
| Phosphorus | 0.005% to 0.12% |
| Silicon | greater than 0.60% |
| Aluminum | 0.05% to 1.0% |

In a second step 28, without a prior annealing of the full hard cold rolled steel coil, the coil is slit to create at least one strip.

Thereafter in step 29, the at least one strip is stamped to create a plurality of exciter rotor laminations and a plurality of exciter stator laminations from the same strip.

In step 30, the exciter rotor laminations are separated from the exciter stator laminations to create the set of exciter rotor laminations and the set of exciter stator laminations.

In step 31, only the set of exciter rotor laminations are annealed. This anneal is conducted in a decarburizing atmosphere with a temperature range of 1300° F. to 1650° F., preferably in a range 1500° to 1580° F.

Thereafter, in step 32, the annealed set of exciter rotor laminations are assembled to create the exciter rotor and also the set of not annealed exciter stator laminations are assembled to create the exciter stator.

The range for silicon may preferably be in a range from 0.80% to 1.60%.

The exemplary embodiment of the method described above improves the method of the prior art for conventional Full Hard CRML steel grades to achieve higher coercivity (Hc) and may be summarized as follows:

1. Silicon content is increased as one of the primary controls for coercivity (Hc). Standard grades of increased silicon content cold rolled electrical steel (CRES) are well known for use in the annealed condition (semi-processed grades defined in ASTM A726 and ASTM 683) and not-annealed condition (fully processed grades defined in ASTM A677). The knowledge, use and application of these grades in the full hard condition, specifically for control of coercivity (Hc) in generator applications, however, have not previously been used.

2. As noted, improvement in coercivity (higher) may be achieved by use of both semi-processed and fully processed electrical steel grades or practices in the full hard condition, based on elimination of annealing at the steel mill following cold rolling. The fundamental criterion is that silicon content is increased, as defined above, and should be >0.60%. The magnetic properties for semi-processed CRML steels with higher silicon contents and fully processed electrical steels with similar silicon contents is approximately the same, in both the not-annealed and the annealed condition. The knowledge, use and application of these grades of fully processed electrical steel in the full hard condition, specifically for control of coercivity (Hc) in generator applications, have not previously been used.

3. Addition of a hot band anneal to the process sequence defined above. This step is already well known to those who are expert in this technology and is necessary if the combination of excellent magnetic properties in the anneal condition is required in combination with improved coercivity (Hc) in the not-annealed condition, using the same material (this combination of properties not being previously known or understood). The addition of a hot band anneal is preferred but not essential.

4. In combination with (1), (2) and (3) above, but not an exclusive component, Cold Mill % reduction >75% is preferred, whereas conventional Cold Mill % reduction for conventional CRML semi-processed grades and fully processed electrical steel grades is >70% but with a maximum of 75%.

Figure 7:
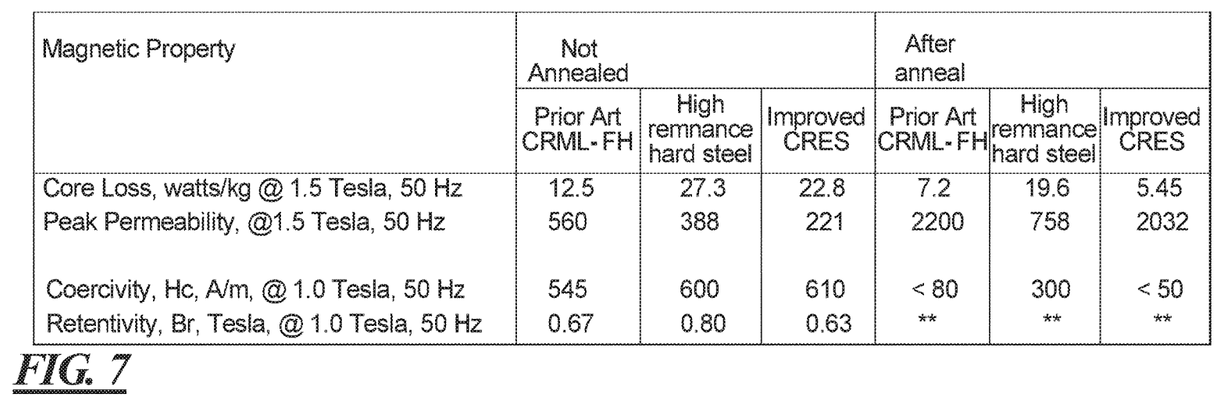
FIG. 7 is a table showing a comparison of magnetic properties before and after anneal for the prior art CRML and high remanence steel, compared to the new improved cold rolled electrical steel (CRES) in the full hard condition according to the exemplary embodiment.

An example and comparison of properties for steel grades with silicon contents above 0.60% and processed as defined above are shown in the table of FIG. 7.

FIG. 7 shows a comparison of magnetic properties before and after anneal for the prior art CRML-FH (0.50 mm) and High remanence steel (1.0 mm) with the new improved practice cold rolled electrical steel (0.50 mm) in the full hard condition according to the exemplary embodiment.

As is seen in FIG. 7, the values of coercivity (Hc) are significantly higher (610 A/m) (where A/m signifies amperes per meter) for the improved practice cold rolled electrical steel (CRES) compared to coercivity values (545 A/m) for the conventional Full Hard CRML used in previous prior art practice. FIG. 7 also clearly shows that the higher values of coercivity (in the not-annealed condition) are uniquely combined with core losses that are significantly lower than conventional CRML-FH. The core loss and permeability values of improved CRES, in the after-anneal condition, are equal to or better than those of a fully processed 600 grade (maximum core loss 6.00 watts/kg at 1.5 Tesla, 50 Hz) whereas the core loss and permeability values of conventional CRML-FH only achieve values equal to those of a fully processed 800 grade (maximum core loss 8.0 watts/kg at 1.5 Tesla, 50 Hz).

As previously noted, coercivity Hc is independent of thickness, whereas core loss is dependent on thickness. Using the higher silicon, improved practice Full Hard CRML, a combination of improved properties in the annealed and not-annealed conditions, for different thicknesses, may be established as shown in the table of FIG. 8.

Figure 8:
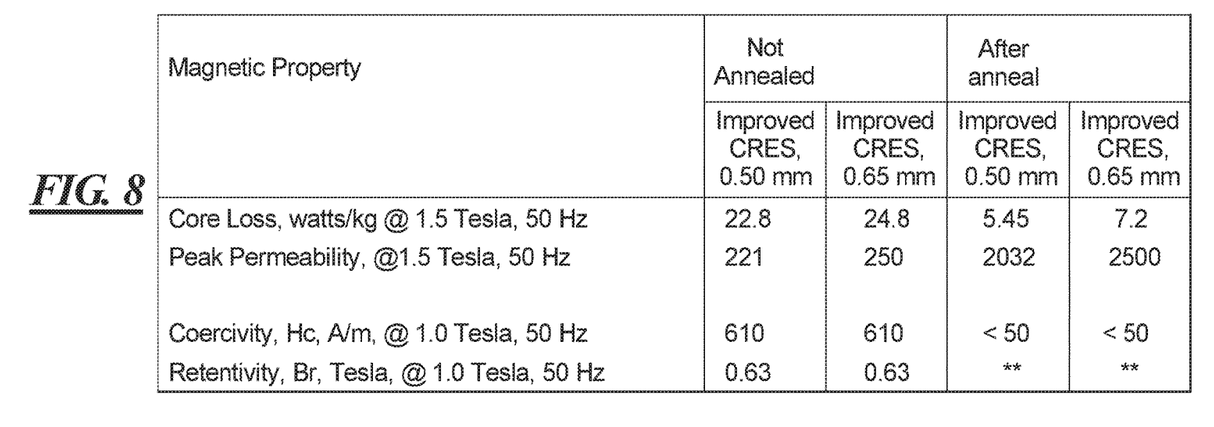
FIG. 8 is a table showing a comparison of magnetic properties for higher silicon improved practice cold rolled electrical steels in the full hard condition at thickness of 0.50 mm and 0.65 mm according to the exemplary embodiment measured after anneal and in the non-annealed conditions.

FIG. 8 shows a comparison of magnetic properties for higher silicon, improved practice cold rolled electrical steels, in the full hard condition at thicknesses of 0.5 mm and 0.65 mm measured after anneal and in the not-annealed conditions.

The purpose of FIG. 8 is to illustrate the point that improved values of coercivity can be obtained in combination with good magnetic properties after anneal for improved CRES, irrespective of thickness. The core loss values after anneal, based on the use of steel processed in the full hard condition, are slightly higher than the value of core loss when the steel is processed using conventional processing, dependent on thickness. This applies to both semi-processed and fully processed grades and processing conditions.

The range of chemistries for these grades of improved cold rolled electrical steel grades (CRES) encompasses ranges of elements described by the following in weight percent:

| | |
|---|---|
| Carbon | less than .04% |
| Manganese | 0.10% to 1.5% |
| Phosphorus | 0.005% to 0.12% |
| Silicon | greater than 0.60% |
| Aluminum | 0.05% to 1.0% |
| Optional | in some practices, Tin or antimony may be added to a max of 0.12% |
| Iron | Balance, minus conventional impurities found in normal steelmaking practices |

The range for silicon in one preferred embodiment may be from 0.80% to 1.60%.

Conventional prior art practice for the use of hard steel as part of the rotor, especially and more usually where hard steel is used in a separate exciter module which is a component of the rotor, is to use a proper fully processed electrical grade for the rotor, while using the hard steel for the stator (in the exciter). A further modification of this practice, to reduce scrap losses, as noted previously, uses hard steel for both the rotor and stator. The major advantages of the improved practice higher silicon steel Full Hard electrical steel of the exemplary embodiment are that:

Higher coercivity values are obtained in the stator of the exciter using this grade of steel in the not annealed condition;

High permeability and low losses in the rotor of the exciter using this same grade of steel in the annealed condition leads to lower heating in the rotor, and higher currents in the exciter rotor winding;

The combination of the above lead to lower costs, including reduction of rotor mass, and introduction of a more reliable rotor excitation design; and From a practical perspective, individual coils of conventional prior art semi-processed or fully processed electrical steel may be diverted from scheduled production for the purpose of supplying a high coercivity grade without the need for different chemistry or the costs of additional processing.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A method to manufacture an improved exciter for a generator, said exciter comprising an exciter rotor and an exciter stator, the exciter rotor and the exciter stator each being formed of a respective set of laminations, of a same electrical steel comprising the steps of:

provisioning a coil of cold rolled electrical steel which after cold-rolling was not subsequently annealed, said electrical steel being full hard which is a condition of the electrical steel in which there is no further change in hardness or tensile strength of the steel following cold rolling and prior to a subsequent anneal, said steel consisting essentially of the following elements in weight percent:

| Carbon | less than 0.04%, |
|---|---|
| Manganese | 0.10% to 1.5%, |
| Phosphorus | 0.005% to 0.12%, |
| Silicon | greater than 0.60%, |
| Aluminum | 0.05% to 1.0%, | and

Iron and conventional impurities as balance;

without a prior annealing of the full hard cold rolled steel coil, slitting the coil to create at least one strip;

stamping the at least one strip to create a plurality of exciter rotor laminations and a plurality of exciter stator laminations from the same strip;

separating the exciter rotor laminations from the exciter stator laminations and creating said set of exciter rotor laminations and said set of exciter stator laminations;

from among said sets of exciter rotor laminations and exciter stator laminations, annealing only said set of exciter rotor laminations; and assembling the annealed set of exciter rotor laminations to create said exciter rotor and assembling the set of not annealed stator laminations to create said exciter stator.

2. The method of claim 1 wherein the carbon is less than 0.008%.

3. The method of claim 1 wherein said silicon weight percent is greater than 0.80%.

4. The method of claim 1 wherein said silicon weight percent lies in a range of 0.80% to 1.60%.

5. The method of claim 1 wherein the annealing of the exciter rotor laminations is conducted in a decarburizing atmosphere within a temperature range of 1300° F. to 1650° F.

6. The method of claim 5 wherein the temperature range is 1500° F. to 1580° F.

7. The method of claim 1 wherein a coercivity of said exciter stator is at least 560 amperes/meter.

8. The method of claim 1 wherein said coil of full hard cold rolled electrical steel which after cold-rolling was not subsequently annealed was created by performing a hot band anneal prior to said a cold rolling step.

9. The method of claim 1 wherein said coil of full hard cold rolled electrical steel which after cold-rolling was not subsequently annealed was created by performing a cold mill reduction greater than 75%.

10. The method of claim 1 wherein said coil of full hard cold rolled electrical steel which after cold-rolling was not subsequently annealed is temper rolled prior to said slitting.

11. A method to manufacture an improved exciter for a generator, said exciter comprising an exciter rotor and an exciter stator, the exciter rotor and the exciter stator each being formed of a respective set of laminations, of a same electrical steel comprising the steps of:

providing a coil of cold rolled electrical steel which after cold-rolling was not subsequently annealed, said electrical steel being full hard which is a condition of the electrical steel in which there is no further change in hardness or tensile strength of the steel following cold rolling and prior to a subsequent anneal, said steel consisting essentially of the following elements in weight percent:

| Carbon | less than 0.04%, |
|---|---|
| Manganese | 0.10% to 1.5%, |
| Phosphorus | 0.005% to 0.12%, |
| Silicon | 0.80% to 1.60%, |
| Aluminum | 0.05% to 1.0%, |

Tin or Antimony less than or equal to 0.12%, and
Iron and conventional impurities as balance;

without a prior annealing of the full hard cold rolled steel coil, slitting the coil to create at least one strip;

stamping the at least one strip to create a plurality of exciter rotor laminations and a plurality of exciter stator laminations from the same strip;

separating the exciter rotor laminations from the exciter stator laminations and creating said set of exciter rotor laminations and said set of exciter stator laminations;

from among said sets of exciter rotor laminations and exciter stator laminations, annealing only said set of exciter rotor laminations; and assembling the annealed set of exciter rotor laminations to create said exciter rotor and assembling the set of not annealed stator laminations to create said exciter stator.

* * * * *